(12) United States Patent
Saeki et al.

(10) Patent No.: US 8,795,093 B2
(45) Date of Patent: Aug. 5, 2014

(54) TORQUE FLUCTUATION ABSORBING APPARATUS

(75) Inventors: Tomohiro Saeki, Anjo (JP); Hiroshi Kawazoe, Kariya (JP); Hiroaki Suezaki, Anjo (JP); Yusaku Nishio, Chiryu (JP); Tsutomu Sekine, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 53 days.

(21) Appl. No.: 13/481,071

(22) Filed: May 25, 2012

(65) Prior Publication Data

US 2012/0298472 A1      Nov. 29, 2012

(30) Foreign Application Priority Data

May 25, 2011    (JP) ................. 2011-116520

(51) Int. Cl.
*F16F 15/129*    (2006.01)
*F16F 15/123*    (2006.01)

(52) U.S. Cl.
CPC ........... *F16F 15/123* (2013.01); *F16F 15/1295* (2013.01)
USPC ...................................... 464/68.41

(58) Field of Classification Search
USPC ............... 464/45, 46, 68.4, 68.41, 68.7, 68.8; 192/107 R, 214.1
See application file for complete search history.

(56) References Cited

U.S. PATENT DOCUMENTS

| | | | | |
|---|---|---|---|---|
| 6,582,312 B2* | 6/2003 | Suzuki et al. | .................... | 464/46 |
| 7,207,887 B2* | 4/2007 | Nakagaito et al. | ............... | 464/46 |
| 7,377,853 B2* | 5/2008 | Takeuchi et al. | ................ | 464/46 |
| 7,467,699 B2* | 12/2008 | Tsuruta et al. | ........... | 464/68.4 X |
| 7,824,269 B2* | 11/2010 | Saeki et al. | ................. | 464/68.41 |
| 7,828,663 B2* | 11/2010 | Saeki et al. | ....................... | 464/46 |
| 8,210,950 B2* | 7/2012 | Nakagaito et al. | .............. | 464/46 |
| 8,282,494 B2* | 10/2012 | Saeki et al. | ...................... | 464/46 |
| 8,357,050 B2* | 1/2013 | Saeki et al. | ...................... | 464/46 |
| 2002/0019262 A1 | 2/2002 | Suzuki et al. | | |
| 2007/0191118 A1* | 8/2007 | Saeki et al. | ...................... | 464/46 |
| 2009/0294239 A1* | 12/2009 | Nakagaito et al. | | |
| 2010/0032259 A1* | 2/2010 | Saeki et al. | | |
| 2010/0051411 A1* | 3/2010 | Saeki et al. | | |
| 2010/0243404 A1* | 9/2010 | Saeki et al. | .............. | 464/68.4 X |
| 2012/0046114 A1* | 2/2012 | Doman et al. | ................... | 464/45 |
| 2012/0142437 A1* | 6/2012 | Doman et al. | ................... | 464/46 |
| 2012/0264522 A1* | 10/2012 | Saeki et al. | ...................... | 464/46 |

FOREIGN PATENT DOCUMENTS

JP    3683165 B2    8/2005

* cited by examiner

*Primary Examiner* — Gregory Binda
*Assistant Examiner* — Matthieu Setliff
(74) *Attorney, Agent, or Firm* — Buchanan Ingersoll & Rooney PC

(57) ABSTRACT

A torque fluctuation absorbing apparatus includes a first side plate, a second side plate, a lining plate disposed between the side plates, a connecting member that connects the side plates at a position that is radially inward relative to the lining plate, a pressure plate disposed between the second side plate and the lining plate, and an elastic member that biases the pressure plate toward the lining plate. The lining plate is slidably sandwiched between the first side plate and the pressure plate, and the first and second side plate each includes a reinforcing portion that includes a portion that is axially curved at a location that is radially outward relative to the connecting member.

6 Claims, 9 Drawing Sheets

Embodiment 4

Embodiment 1

Embodiment 1

Embodiment 2

Embodiment 3

Embodiment 4

Embodiment 5

Embodiment 6

Embodiment 7

TORQUE FLUCTUATION ABSORBING APPARATUS

CROSS REFERENCE TO RELATED APPLICATIONS

This application is based on and claims priority under 35 U.S.C. §119 to Japanese Patent Application 2011-116520, filed on May 25, 2011, the entire content of which is incorporated herein by reference.

TECHNICAL FIELD

This disclosure relates to a torque fluctuation absorbing apparatus which absorbs a fluctuating torque between rotating shafts, and in particular to a torque fluctuation absorbing apparatus which includes a limiter portion that generates slippage when the fluctuating torque reaches a predetermined value.

BACKGROUND DISCUSSION

A known torque fluctuation absorbing apparatus is provided on a drivetrain between an engine and a transmission, and absorbs (restrains) a fluctuating torque between the engine and the transmission. The known torque fluctuation absorbing apparatus includes a damper portion that absorbs the fluctuating torque by means of a spring force, a hysteresis portion that absorbs (restrains) the fluctuating torque by means of a hysteresis torque generated by friction, and a limiter portion that generates slippage when a torsion of the rotating shafts is beyond the absorption capabilities of the damper portion and the hysteresis portion.

In the limiter portion, a lining support plate (lining plate) having a lining portion (friction member) on both surfaces is slidably sandwiched between drive plates (side plates) and a presser plate (pressure plate), and the lining support plate is attached to a flywheel by a bolt at a portion that is radially outward relative to the lining portion (for example, see FIG. 1 of JP 3,683,165 (hereinafter referred to as Reference 1)).

However, in case the lining support plate is attached to the fly wheel such as in the limiter portion of the torque fluctuation absorbing apparatus disclosed in Reference 1, the strength in the axial direction of the drive plates provided on both sides of the lining support plate is insufficient, and the sliding surfaces of the limiter portion are unstable, and thus the characteristics of the limiter portion may become unstable.

A need thus exists for a torque fluctuation absorbing apparatus which is not susceptible to the drawback mentioned above.

SUMMARY

According to an aspect of this disclosure, a torque fluctuation absorbing apparatus includes a first side plate, a second side plate disposed at an axially displaced position from the first side plate, a lining plate that is disposed between the first side plate and the second side plate and is connected to a flywheel at a position that is radially outward relative to the first side plate and the second side plate, a connecting member that connects the first side plate and the second side plate with a predetermined gap in the axial direction at a position that is radially inward relative to the lining plate, a pressure plate disposed between the second side plate and the lining plate, and an elastic member that is supported by the second side plate and biases the pressure plate toward the lining plate. The lining plate is slidably sandwiched between the first sideplate and the pressure plate, and the first side plate and the second side plate each include a reinforcing portion having a portion that is axially curved at a location that is radially outward relative to the connecting member.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION

Figure 1:
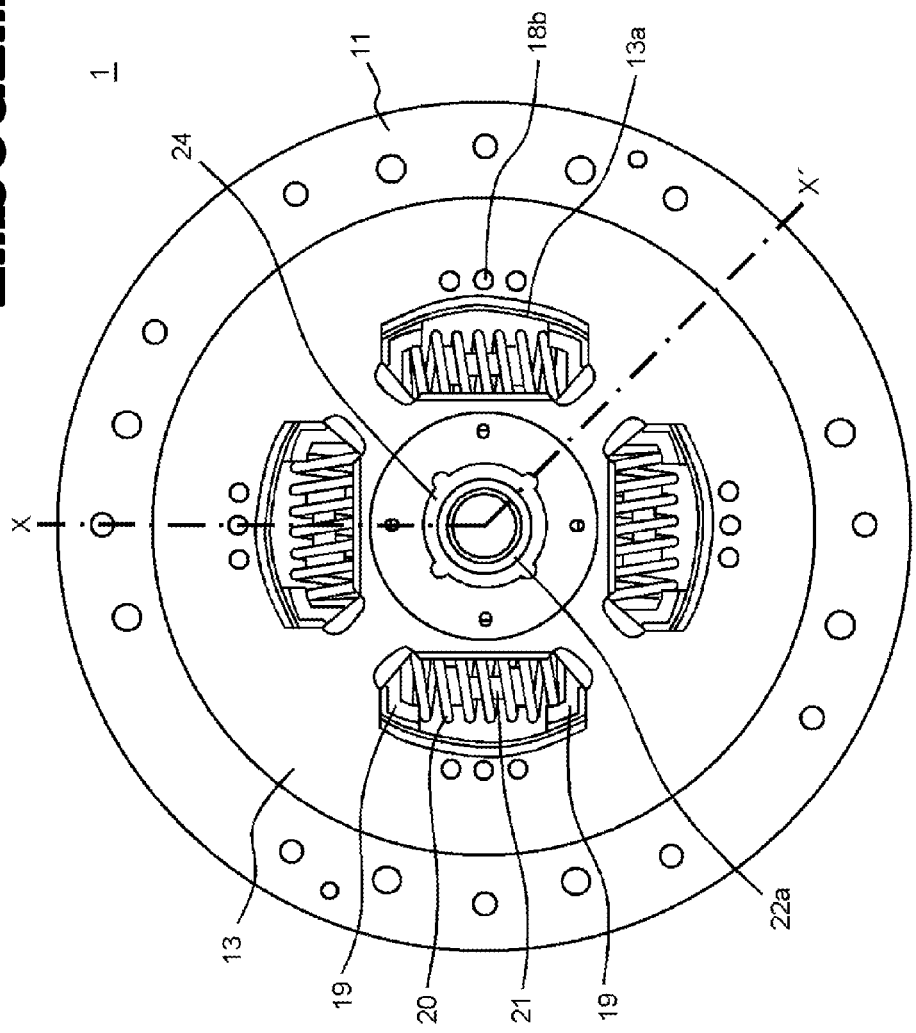
FIG. 1 is a plane view schematically illustrating a structure of a torque fluctuation absorbing apparatus according to a first embodiment disclosed here.

According to an aspect of this disclosure, a torque fluctuation absorbing apparatus includes a first side plate (12 in FIG. 2), a second side plate (13 in FIG. 2) disposed at an axially displaced position from the first side plate, a lining plate (11 in FIG. 2) that is disposed between the first side plate and the second side plate and is connected to a flywheel (7 in FIG. 2) at a position that is radially outward relative to the first side plate and the second side plate, a connecting member (18 in FIG. 2) that connects the first side plate and the second side plate with a predetermined gap in the axial direction at a position that is radially inward relative to the lining plate, a pressure plate (14 in FIG. 2) disposed between the second side plate and the lining plate, and an elastic member (15 in FIG. 2) that is supported by the second side plate and biases the pressure plate toward the lining plate. The lining plate is slidably sandwiched between the first side plate and the pressure plate, and the first side plate and the second side plate each include a reinforcing portion (12c and 13c in FIG. 2) having a portion that is axially curved at a location that is radially outward relative to the connecting member. According to this aspect, the strength in the axial direction of the first side plate and the second side plate can be improved by providing the reinforcing portions to the first side plate and the second side plate.

When reference numerals are given in the drawings in this application, they are intended to help understanding without limitation to the aspect in the drawings.

Figure 2:
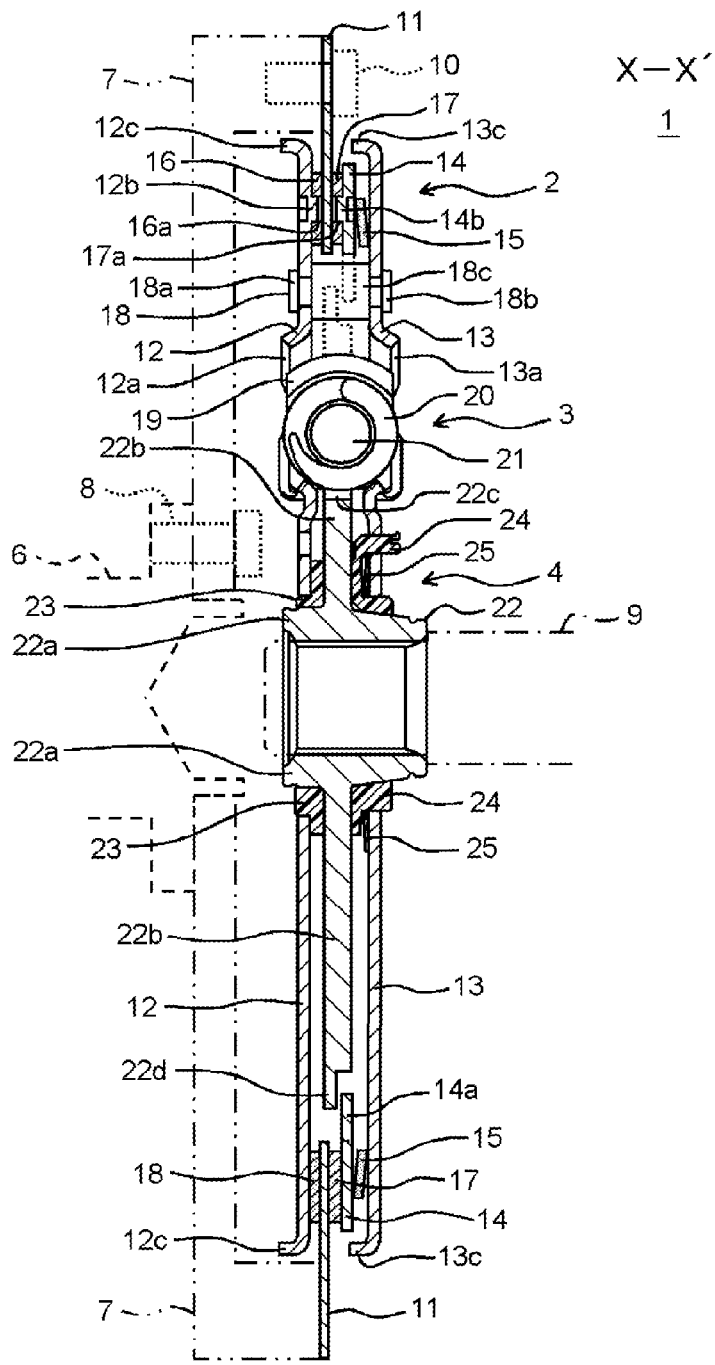
FIG. 2 is a section view taken on line X-X' illustrated in FIG. 1.
Figure 3:
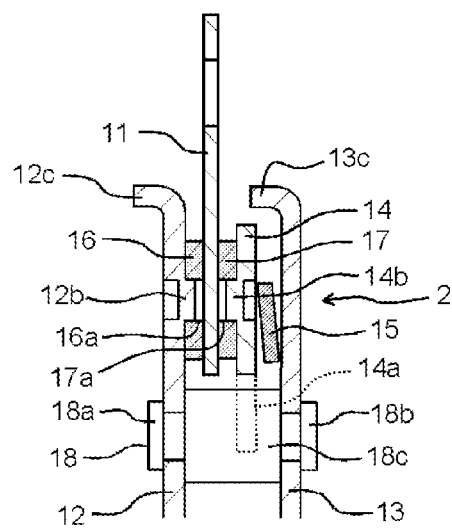
FIG. 3 is an enlarged section view schematically illustrating a limiter portion in the torque fluctuation absorbing apparatus according to the first embodiment disclosed here.

A first embodiment of the torque fluctuation absorbing apparatus disclosed here will be explained with reference to the drawings. FIG. 1 is a plane view schematically illustrating a structure of the torque fluctuation absorbing apparatus according to a first embodiment disclosed here. FIG. 2 is a section view taken on line X-X' illustrated in FIG. 1. FIG. 3 is an enlarged section view schematically illustrating a limiter portion in the torque fluctuation absorbing apparatus according to the first embodiment disclosed here.

The torque fluctuation absorbing apparatus 1 according to the first embodiment is provided, for example, on a drivetrain between a crank shaft 6 (output shaft) of an engine (power source; can be a motor) and an input shaft 9 of a transmission so as to absorb (restrain) a fluctuating torque generated by a torsion between the rotating shafts (between the crank shaft 6 and the input shaft 9) (see FIGS. 1 and 2). The torque fluctuation absorbing apparatus 1 includes a damper portion 3 that has a torsion-absorbing function and absorbs the fluctuating torque between the rotating shafts by means of a spring force, a hysteresis portion 4 that absorbs (restrains) the fluctuating torque between the rotating shafts by means of a hysteresis torque generated by friction or the like, and a limiter portion 2 that generates slippage at or above a prescribed torque when the torsion between the rotating shafts is beyond the absorption capabilities of the damper portion 3 and the hysteresis portion 4. The damper portion 3 is placed parallelly with the hysteresis portion 4 in the drivetrain. The limiter portion 2 is placed serially with the damper portion 3 and with the hysteresis portion 4 in the drivetrain.

The torque fluctuation absorbing apparatus 1 includes the following constituent members: a lining plate 11, side plates 12 and 13, a pressure plate 14, a disc spring 15, friction members 16 and 17, a connecting member 18, a seat member 19, a coil spring 20, a cushion member 21, a hub member 22, thrust members 23 and 24, and a disc spring 25.

The lining plate 11 is a ring-shaped member disposed between the friction members 16 and 17 which are located between the side plate 12 and the pressure plate 14, and the lining plate 11 is a constituent member of the limiter portion 2 (see FIGS. 1 to 3). The lining plate 11 is fixed to a flywheel 7 by a plurality of bolts 10 at its outer circumferential portion. The lining plate 11 rotates integrally with the flywheel 7. The lining plate 11 is disposed between the friction members 16 and 17 at its inner circumferential portion and is slidably pressed against the friction members 16 and 17. The lining plate 11 is preferably made of a metal (such as stainless steel) that is more resistant to rust than iron in order to prevent adhesion to the friction members 16 and 17 due to the occurrence of rust. The flywheel 7 is connected to the crank shaft 6 of the engine (not illustrated) by a bolt 8, and rotates integrally with the crank shaft 6.

The side plate 12 is a ring-shaped member disposed on the engine side (left side in FIG. 2) of a flange 22b of the hub member 22, and the side plate 12 is a constituent member of the limiter portion 2, the damper portion 3, and the hysteresis portion 4 (see FIGS. 2 and 3). The side plate 12 includes a rib 12c, an outer circumferential end of which is curved toward the engine side in the axial direction (left side in FIG. 3). The rib 12c is a reinforcing portion for supplementing the strength in the axial direction of the side plate 12 (in particular, the limiter portion 2). The rib 12c is formed continuously (partially is also possible) in the circumferential direction, and is formed radially outward relative to the connecting member 18. The side plate 12 includes a plurality of protruding portions 12b that protrude toward the lining plate 11 side in the limiter portion 2 that is radially inward relative to the rib 12c. The protruding portions 12b are portions that retain the friction member 16 so as to control the motion in the circumferential direction of the friction member 16 relative to the side plate 12 by fitting into a hole 16a of the friction member 16. The side plate 12 is disposed with a predetermined gap in the axial direction between it and the side plate 13. The side plate 12 is integrally fixed to the side plate 13 by the connecting member 18 at a position that is radially inward relative to the limiter portion 2. The side plate 12 is caulk-fixed by a caulking portion 18a on the engine side (left side in FIG. 3) of a body portion 18c of the connecting member 18. The side plate 12 includes a window portion 12a for accommodating the seat member 19 and the coil spring 20 in the damper portion 3 that is radially inward relative to the connecting member 18. An end face in the circumferential direction of the window portion 12a is in contact with the seat member 19 so as to be in and out of contact with the seat member 19. The side plate 12 engages with the thrust member 23 so that it cannot rotate but can move axially in the hysteresis portion 4 that is radially inward relative to the damper portion 3. The side plate 12 is rotatably supported on its inner circumferential end by the hub member 22 (a hub portion 22a) via the thrust member 23. The sideplate 12 is preferably made using stainless steel in order to ensure the strength in the axial direction, and it is preferably subjected to a heat treatment in at least the portion including the rib 12c. Not only the side plate 12, but the side plate 13 and the lining plate 11 can also be subjected to a heat treatment. As the heat treatment, for example, mention may be made of carburization, nitrification, induction hardening, and the like. A surface treatment can be implemented instead of a heat treatment. As the surface treatment, for example, mention may be made of plating or a Parker treatment.

The side plate 13 is a ring-shaped member disposed on the transmission side (right side in FIG. 2) of a flange 22b of the hub member 22, and is a constituent member of the limiter portion 2, the damper portion 3, and the hysteresis portion 4. The side plate 13 includes a rib 13c, an outer circumferential end of which is curved toward the engine side in the axial direction (left side in FIG. 3). The rib 13c is a reinforcing portion for supplementing the strength in the axial direction of the side plate 13 (in particular, the limiter portion 2). The rib 13c is formed continuously (partially is also possible) in the circumferential direction, and is formed radially outward relative to the connecting member 18. The side plate 13 supports an inner circumferential end of the disc spring 15 in the limiter portion 2 that is radially inward relative to the rib 13c. The side plate 13 is disposed with a predetermined gap in the axial direction between it and the side plate 12. The side plate 13 is integrally fixed to the side plate 12 by the connecting member 18 at a position that is radially inward relative to the limiter portion 2. The side plate 13 is caulk-fixed by a caulking portion 18b on the transmission side (right side in FIG. 3) of the body portion 18c of the connecting member 18. The side plate 13 includes a window portion 13a for accommodating the seat member 19 and the coil spring 20 in the damper portion 3 that is radially inward relative to the connecting member 18. An end face in the circumferential direction of the window portion 13a is in contact with the seat member 19 so as to be in and out of contact with the seat member 19. The side plate 13 engages with the thrust member 24 so that it cannot rotate but can move axially in the hysteresis portion 4 that is radially inward relative to the damper portion 3, and the side plate 13 supports the outer circumferential end of the disc spring 25. The side plate 13 is rotatably supported on its inner circumferential end by the hub member 22 (a hub portion 22a) via the thrust member 24. The side plate 13 is preferably made using stainless steel in order to ensure the strength in the axial direction, and it is preferably subjected to a heat treatment in at least the portion including the rib 13c.

The pressure plate 14 is a ring-shaped member disposed between the disc spring 15 and the friction member 17, and is a constituent element of the limiter portion 2. The pressure plate 14 includes a convex portion 14a for allowing the pressure plate 14 to be supported on its inner circumferential end so that it cannot rotate but can move axially relative to the body portion 18c of the connecting member 18. The pressure plate 14 is biased toward the friction member 17 by the disc spring 15. The pressure plate 14 includes a plurality of protruding portions 14b that protrude toward the lining plate 11 side. The protruding portions 14b are portions that retain the friction member 17 so as to control the motion in the circumferential direction of the friction member 17 relative to the pressure plate 14 by fitting into a hole 17a of the friction member 17.

The disc spring 15 is a disc-shaped spring disposed between the side plate 13 and the pressure plate 14, and is a constituent member of the limiter portion 2. The disc spring 15 is supported on its inner circumferential end by the support plate 10, and the outer circumferential end of the disc spring 15 biases the pressure plate 14 toward the side plate 12.

The friction member 16 is a constituent member of the limiter portion 2, and is disposed between the lining plate 11 and the side plate 12. The friction member 16 is constituted in a ring shape. The friction member 16 includes a plurality of penetrating holes 16a. The holes 16a are portions that control the motion in the circumferential direction of the friction member 16 relative to the side plate 12 by fitting the protruding portions 12b of the side plate 12 therein. The friction member 16 is slidably pressed against the lining plate 11. As the friction member 16, a member including rubber, resin, fibers (short fiber, long fiber), particles for adjusting the friction coefficient μ, and the like can be used.

The friction member 17 is a constituent member of the limiter portion 2, and is disposed between the lining plate 11 and the pressure plate 14. The friction member 17 is constituted in a ring shape. The friction member 17 includes a plurality of penetrating holes 17a. The holes 17a are portions that control the motion in the circumferential direction of the friction member 17 relative to the pressure plate 14 by accommodating the protruding portions 14b of the pressure plate 14 therein. The friction member 17 is slidably pressed against the lining plate 11. As the friction member 17, a member including rubber, resin, fibers (short fiber, long fiber), particles for adjusting the friction coefficient μ, and the like can be used.

The connecting member 18 is a member for integrally fixing (connecting) the side plate 12 and the side plate 13 with a predetermined gap in the axial direction. The connecting member 18 includes a body portion 18c disposed between the side plate 12 and the side plate 13. On the side plate 12 side of the body portion 13c, the connecting member 18 includes the caulking portion 18a for caulk-fixing the side plate 12 to the body portion 18c. On the side plate 13 side of the body portion 18c, the connecting member 18 includes the caulking portion 18b for caulk-fixing the sideplate 13 to the body portion 18c. The body portion 18c engages with the convex portion 14a of the pressure plate 14 so that it cannot rotate but can move axially. The body portion 18c also serves as a stopper portion that controls the torsion of the damper portion 3 at a prescribed angle, and it controls the torsion of the damper portion 3 by hitting against a convex portion 22d of the hub member 22 when torsion is generated in the damper portion 3.

The seat member 19 is a constituent member of the damper portion 3. The seat member 19 is accommodated by the window portions 12a, 13a, and 22c formed on the side plates 12 and 13 and the hub member 22 (flange 22b). The seat member 19 is disposed between the end faces in the circumferential direction of the window portions 12a, 13a, and 22c and the end of the coil spring 20. A resin can be used for the seat member 19 in order to reduce the wear on the coil spring 20.

The coil spring 20 is a constituent member of the damper portion 3. The coil spring 20 is accommodated by the window portions 12a, 13a, and 22c formed respectively on the side plates 12 and 13 and the hub member 22 (flange 22b), and is in contact with the seat members 19 disposed on both ends of the coil spring 20. The coil spring 20 contracts when the side plates 12 and 13 rotate relative to the hub member 22, and absorbs a shock generated by a rotational difference between the side plates 12 and 13 and the hub member 22. The coil spring 20 may be formed to have a straight shape, or may be formed into the straight shape and then bent to form an arc while being assembled. Alternatively, an arc spring having an arc shape in the circumferential direction may be used so as to realize a large torsion.

The cushion member 21 is a member that absorbs a shock when the convex portion 22d of the hub member 22 hits against the body portion 18c of the connecting member 18 when torsion is generated in the damper portion 3. The cushion member 21 is disposed inside the coil spring 20. The cushion member 21 is in a free state until it is sandwiched between a pair of seat members 19 when torsion is generated in the damper portion 3, and is sandwiched between the pair of seat members 19 before the convex portion 22d of the hub member 22 hits against the body portion 18c of the connecting member 18.

The hub member 22 is a member that outputs a rotative power from the damper portion 3 and the hysteresis portion 4 to the transmission, and is a constituent member of the damper portion 3 and the hysteresis portion 4. The hub member 22 includes the flange 22b that extends from a predetermined location on the outer periphery of the hub portion 22a. An inner circumferential surface of the hub portion 22a is spline-engaged with the input shaft 9 of the transmission. The outer periphery of the hub portion 22a rotatably supports the side plate 12 via the thrust member 23, and rotatably supports the side plate 13 via the thrust member 24. The flange 22b includes, in the damper portion 3, a window portion 22c for accommodating the coil spring 20 and the seat member 19. The circumferential end face of the window portion 22c is in contact with the seat member 19 so as to be in and out of contact with the seat member 19. The flange 22b is slidably sandwiched by the thrust member 23 and the thrust member 24 at a surface in the axial direction of the hysteresis portion 4 that is circumferentially inward relative to the damper portion 3. The outer circumferential end of the flange 22b includes a plurality of convex portions 22d that protrude radially outward. The convex portions 22d are portions that control the torsion of the damper portion 3 at a prescribed angle, and they control the torsion of the damper portion 3 by hitting against the body portion 18c of the connecting member 18 when torsion is generated in the damper portion 3. The convex portions 22d are formed so as not to conflict with the convex portions 14a of the pressure plate 14.

The thrust member 23 is a constituent member of the hysteresis portion 4, and is a ring-shaped member disposed between the side plate 12 and the hub member 22. The thrust member 23 is positioned between the side plate 12 and the flange 22b in the axial direction. The thrust member 23 engages with the side plate 12 so that it cannot rotate but can move axially, and is slidably pressed against the flange 22b. The thrust member 23 is also interposed between the side plate 12 and the hub portion 22a in the radial direction, and serves as a sliding bearing (a bush) for rotatably supporting the side plate 12 on the hub portion 22a.

The thrust member 24 is a constituent member of the hysteresis portion 4, and is a ring-shaped member disposed between the side plate 13 and the hub member 22. The thrust member 24 is positioned between the disc spring 25 and the flange 22b in the axial direction. The thrust member 24 engages with the side plate 13 so that it cannot rotate but can move axially, and the thrust member 24 is biased toward the flange 22b by the disc spring 25 and slidably pressed against the flange 22b. The thrust member 24 is also interposed between the side plate 13 and the hub portion 22a in the radial direction, and serves as a sliding bearing (a bush) for rotatably supporting the side plate 13 on the hub portion 22a.

The disc spring 25 is a constituent member of the hysteresis portion 4. The disc spring 25 is a disc-shaped spring that is disposed between the thrust member 24 and the side plate 13 and biases the thrust member 24 toward the flange 22b.

In the constitution of the limiter portion 2 in FIG. 3, the friction member 16 and the friction member 17 are retained (they can also be fixed) on the side plate 12 and the pressure plate 14 respectively, and the lining plate 11 slides relative to the friction members 16 and 17. However, the limiter portion 2 can also have a constitution in which the protruding portions 12b and 14b are eliminated, the friction members 16 and 17 are fixed (includes adhering) or retained on the lining plate 11, and the side plate 12 and the pressure plate 14 slide relative to the friction members 16 and 17, respectively.

According to the first embodiment, the strength in the axial direction of the side plates 12 and 13 can be improved by providing the ribs 12c and 13c to the side plates 12 and 13.

Figure 4:
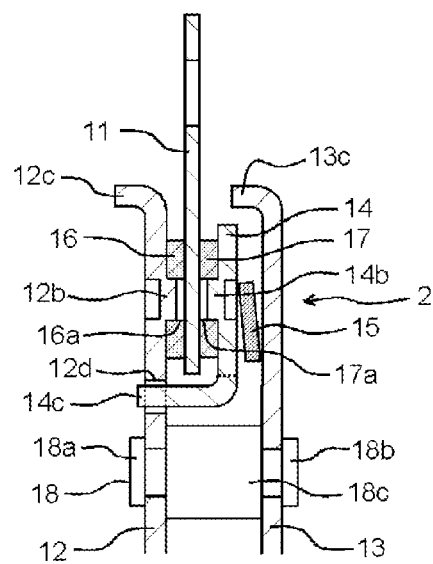
FIG. 4 is an enlarged section view schematically illustrating a limiter portion in the torque fluctuation absorbing apparatus according to a second embodiment disclosed here.

A second embodiment of the torque fluctuation absorbing apparatus disclosed here will be explained with reference to the drawings. FIG. 4 is an enlarged section view schematically illustrating a limiter portion in the torque fluctuation absorbing apparatus according to a second embodiment disclosed here.

The second embodiment is a variation of the first embodiment. In the second embodiment, a convex portion 14c for detention of the pressure plate 14 engages with a hole 12d formed in the side plate 12 instead of the body portion 18c of the connecting member 18, and thereby the motion in the circumferential direction of the pressure plate 14 is controlled relative to the side plate 12. The convex portion 14c is bent over axially toward the engine side (left side in FIG. 4) from the inner circumferential end of the main body (ring-shaped portion) of the pressure plate 14. The convex portion 14c passes through the radially inward side of the friction member 17, the lining plate 11, and the friction member 16 and then penetrates through the hole 12d of the side plate 12. The convex portion 14c engages with the hole 12d so that it cannot move in the circumferential direction but can move axially. Other structures of the second embodiment are identical to those of the first embodiment.

According to the second embodiment, effects similar to the first embodiment are attained.

Figure 5:
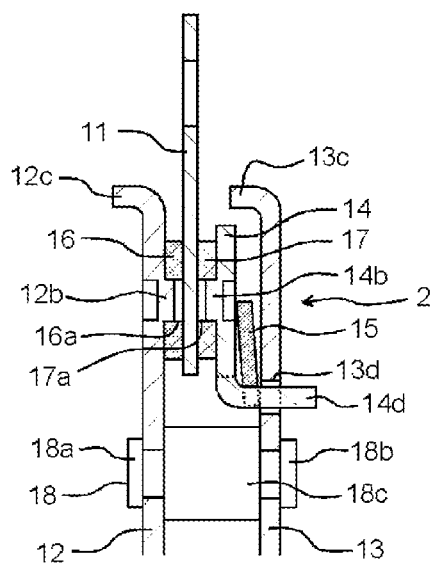
FIG. 5 is an enlarged section view schematically illustrating a limiter portion in the torque fluctuation absorbing apparatus according to a third embodiment disclosed here.

A third embodiment of the torque fluctuation absorbing apparatus disclosed here will be explained with reference to the drawings. FIG. 5 is an enlarged section view schematically illustrating a limiter portion in the torque fluctuation absorbing apparatus according to a third embodiment disclosed here.

The third embodiment is a variation of the second embodiment. In the third embodiment, a convex portion 14d for detention of the pressure plate 14 engages with a hole 13d of the side plate 13 instead of the side plate 12, and thereby the motion in the circumferential direction of the pressure plate 14 is controlled relative to the side plate 13. The convex portion 14d is bent over axially toward the transmission side (right side in FIG. 5) from the inner circumferential end of the main body (ring-shaped portion) of the pressure plate 14. The convex portion 14d passes through the radially inward side of the disc spring 15 and then penetrates through the hole 13d of the side plate 13. The convex portion 14d engages with the hole 13d so that it cannot move in the circumferential direction but can move axially. Further, the inner circumferential portion of the disc spring 15 is formed so as to engage with the convex portion 14d so that it cannot move in the circumferential direction, can move in the axial direction, and cannot move in the radial direction. Thereby, the disc spring 15 can be positioned, the wear on the disc spring 15 can be suppressed, and fluctuations in the characteristics of the disc spring 15 can be suppressed. Other structures of the third embodiment are identical to those of the second embodiment.

According to the third embodiment, effects similar to the second embodiment are attained.

Figure 6:
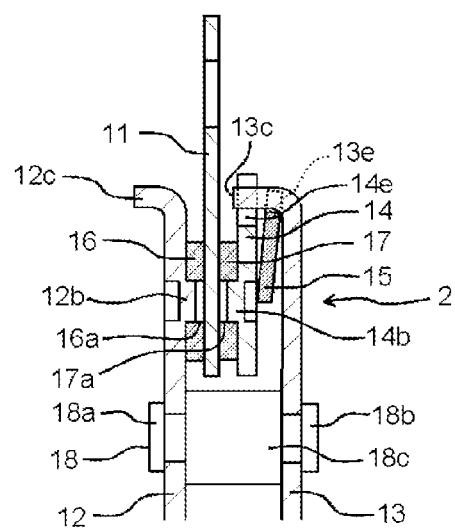
FIG. 6 is an enlarged section view schematically illustrating a limiter portion in the torque fluctuation absorbing apparatus according to a fourth embodiment disclosed here.

A fourth embodiment of the torque fluctuation absorbing apparatus disclosed here will be explained with reference to the drawings. FIG. 6 is an enlarged section view schematically illustrating a limiter portion in the torque fluctuation absorbing apparatus according to a fourth embodiment disclosed here.

The fourth embodiment is a variation of the first embodiment. In the fourth embodiment, a convex portion 14e of the pressure plate 14 is formed on the outer circumferential end rather than the inner circumferential end, and a cutout 13e is formed on a cylindrical rib 13c of the side plate 13. The convex portion 14e engages with the cutout 13e, and thereby the motion in the circumferential direction of the pressure plate 14 is controlled relative to the side plate 13. The convex portion 14e extends radially outward from the outer circumferential end of the main body (ring-shaped portion) of the pressure plate 14, and is inserted into the cutout 13e in the rib 13c of the sideplate 13. The convex portion 14e engages with the cutout 13e so that it cannot move in the circumferential direction but it can move axially. Further, the outer circumferential portion of the disc spring 15 is formed so as to engage with the cutout 13e so that it cannot move in the circumferential direction, can move in the axial direction, and cannot move in the radial direction. Thereby, the disc spring 15 can be positioned, the wear on the disc spring 15 can be suppressed, and fluctuations in the characteristics of the disc spring 15 can be suppressed. Other structures of the fourth embodiment are identical to those of the first embodiment.

According to the fourth embodiment, effects similar to the first embodiment are attained.

Figure 7:
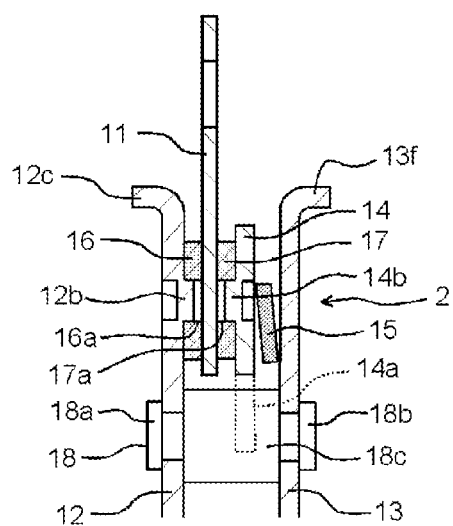
FIG. 7 is an enlarged section view schematically illustrating a limiter portion in the torque fluctuation absorbing apparatus according to a fifth embodiment disclosed here.

A fifth embodiment of the torque fluctuation absorbing apparatus disclosed here will be explained with reference to the drawings. FIG. 7 is an enlarged section view schematically illustrating a limiter portion in the torque fluctuation absorbing apparatus according to a fifth embodiment disclosed here.

The fifth embodiment is a variation of the first embodiment. In the fifth embodiment, a rib 13f formed on the side plate 13 is curved in the axial direction toward the transmission side (right side in FIG. 7) instead of in the axial direction toward the engine side (left side in FIG. 7). Other structures of the fifth embodiment are identical to those of the first embodiment.

According to the fifth embodiment, effects similar to the first embodiment are attained.

Figure 8:
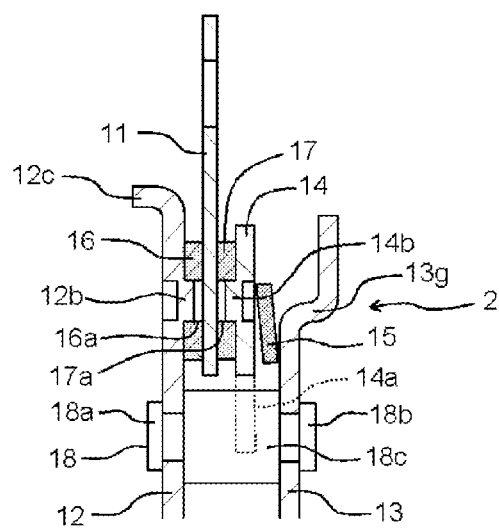
FIG. 8 is an enlarged section view schematically illustrating a limiter portion in the torque fluctuation absorbing apparatus according to a sixth embodiment disclosed here.

A sixth embodiment of the torque fluctuation absorbing apparatus disclosed here will be explained with reference to the drawings. FIG. 8 is an enlarged section view schematically illustrating a limiter portion in the torque fluctuation absorbing apparatus according to a sixth embodiment disclosed here.

The sixth embodiment is a variation of the first embodiment. In the sixth embodiment, instead of a rib portion (13c in FIG. 3), a stepped portion 13g that is formed in a stepped shape is formed on the side plate 13. The stepped portion 13g is formed in a shape in which an outer circumferential portion of the side plate 13 is bent over in the axial direction toward the transmission side (right side in FIG. 8) and the distal end portion thereof is further bent radially outward. The stepped portion 13g serves as a reinforcing portion for supplementing the strength in the axial direction of the side plate 13 (especially the limiter portion 2). The stepped portion 13g is formed continuously (partially is also possible) in the circumferential direction, and is formed radially outward relative to the connecting member 18. Other structures of the sixth embodiment are identical to those of the first embodiment.

According to the sixth embodiment, effects similar to the first embodiment are attained.

Figure 9:
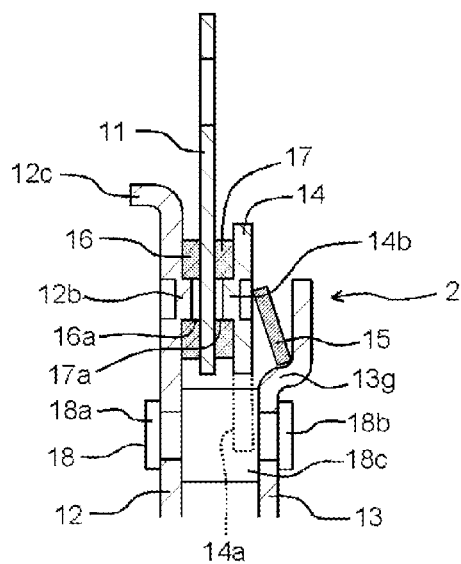
FIG. 9 is an enlarged section view schematically illustrating a limiter portion in the torque fluctuation absorbing apparatus according to a seventh embodiment disclosed here.

A seventh embodiment of the torque fluctuation absorbing apparatus disclosed here will be explained with reference to the drawings. FIG. 9 is an enlarged section view schematically illustrating a limiter portion in the torque fluctuation absorbing apparatus according to a seventh embodiment disclosed here.

The seventh embodiment is a variation of the sixth embodiment. In the seventh embodiment, an inner circumferential end of the disc spring 15 in the limiter portion 2 is supported at a portion that is radially outward rather than radially inward relative to the stepped portion 13g of the side plate 13. The radial motion of the disc spring 15 is controlled by a radially outward surface of the stepped portion 13g. Other structures of the seventh embodiment are identical to those of the sixth embodiment.

According to the seventh embodiment, effects similar to the sixth embodiment are attained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorbing apparatus comprising:
a first side plate;
a second side plate disposed at an axially displaced position from the first side plate;
a lining plate that is disposed between the first side plate and the second side plate and is connected to a flywheel at a position that is radially outward relative to the first side plate and the second side plate;
a connecting member that connects the first side plate and the second side plate with a predetermined gap in the axial direction at a position that is radially inward relative to the lining plate;
a pressure plate disposed between the second side plate and the lining plate; and
an elastic member that is supported by the second side plate and biases the pressure plate toward the lining plate;
the lining plate being slidably sandwiched between the first side plate and the pressure plate,
the first side plate and the second side plate each including a reinforcing portion having a portion that is axially curved at a location that is radially outward relative to the connecting member; and
wherein the reinforcing portion of the second side plate is a rib that is curved once from a main body of the second side plate toward the lining plate side in the axial direction and is formed continuously in the circumferential direction, the rib includes a cutout that is cut out from a distal end of the rib, and the pressure plate includes a convex portion at its outer circumferential end face that engages the cutout so that the pressure plate cannot move in the circumferential direction but can move in the axial direction.

2. The torque fluctuation absorbing apparatus according to claim 1, wherein the reinforcing portion of the first side plate is a rib that is curved once in one axial direction or the other axial direction from a main body and formed continuously or partially in the circumferential direction.

3. The torque fluctuation absorbing apparatus according to claim 1, wherein the elastic member engages with the rib so that it cannot move in the circumferential direction, can move in the axial direction, and cannot move in the radial direction.

4. The torque fluctuation absorbing apparatus according to claim 1, wherein at least one plate among the first side plate, the second side plate, and the lining plate is made of stainless steel.

5. The torque fluctuation absorbing apparatus according to claim 1, wherein at least one plate among the first side plate, the second side plate, and the lining plate is subjected to a heat treatment or a surface treatment at a portion thereof including the reinforcing portion.

6. The torque fluctuation absorbing apparatus according to claim 1, wherein the elastic member engages the cutout in the rib so that the elastic member cannot move in the circumferential direction, can move in the axial direction, and cannot move in the radial direction.

* * * * *